US010221312B2

(12) United States Patent
Nakai et al.

(10) Patent No.: US 10,221,312 B2
(45) Date of Patent: Mar. 5, 2019

(54) POLYAMIDE RESIN COMPOSITION

(71) Applicant: UNITIKA LTD., Hyogo (JP)

(72) Inventors: Miho Nakai, Kyoto (JP); Shohei Kumazawa, Kyoto (JP); Kenji Ikemoto, Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 15/547,904

(22) PCT Filed: Mar. 2, 2016

(86) PCT No.: PCT/JP2016/056356
§ 371 (c)(1),
(2) Date: Aug. 1, 2017

(87) PCT Pub. No.: WO2016/140240
PCT Pub. Date: Sep. 9, 2016

(65) Prior Publication Data
US 2018/0022920 A1    Jan. 25, 2018

(30) Foreign Application Priority Data

Mar. 3, 2015    (JP) .................................. 2015-041353

(51) Int. Cl.
*C08L 77/02*  (2006.01)
*C08L 1/02*   (2006.01)
*C08K 7/02*   (2006.01)

(52) U.S. Cl.
CPC .............. *C08L 77/02* (2013.01); *C08K 7/02* (2013.01); *C08L 1/02* (2013.01); *C08L 2205/16* (2013.01); *C08L 2314/00* (2013.01)

(58) Field of Classification Search
CPC ........ C08L 1/02; C08L 77/02; C08L 2205/16; C08L 2314/00; C08K 7/02

USPC .......................................................... 524/733
See application file for complete search history.

(56) References Cited

U.S. PATENT DOCUMENTS

2013/0030090 A1    1/2013  Nakai et al.
2013/0310795 A1*  11/2013  Glahn ............... A61F 13/51496
                                                           604/392
2016/0002461 A1    1/2016  Tsujii et al.

FOREIGN PATENT DOCUMENTS

| JP | 2010-77248  | 4/2010  |
| JP | 2013-79334  | 5/2013  |
| JP | 2014-136745 | 7/2014  |
| JP | 2015-51631  | 3/2015  |
| WO | 2011/126038 | 10/2011 |
| WO | 2014/133019 | 9/2014  |

OTHER PUBLICATIONS

International Search Report in corresponding PCT application No. PCT/JP2016/056356, dated May 31, 2017.
English language machine translation of JP 2013-79334.
English language machine translation of JP 2015-51631.
English language machine translation of JP 2014-136745.
English language machine translation of JP 2010-77248.

* cited by examiner

*Primary Examiner* — William K Cheung
(74) *Attorney, Agent, or Firm* — Fildes & Outland, P.C.

(57) ABSTRACT

Provided is a polyamide resin composition including 0.01 to 50 parts by mass of cellulose fiber in relation to 100 parts by mass of a polyamide resin, having a relative viscosity of 2.3 or more, and having an L-value, an a-value and a b-value in an Lab color space of 20 or more, 10 or less and 20 or less, respectively. The aforementioned polyamide resin composition is obtained by subjecting a polyamide resin composition having a relative viscosity of 2.2 or less to a solid phase polymerization.

10 Claims, No Drawings

POLYAMIDE RESIN COMPOSITION

This application is a national stage of PCT International Application No. PCT/JP2016/056356, filed on Mar. 2, 2016, which claims priority to and incorporates by reference the entire contents of Japanese Patent Application No. 2015-041353 filed in Japan on Mar. 3, 2015.

TECHNICAL FIELD

The present invention relates to a polyamide resin composition including cellulose fiber and a polyamide resin, the composition having a high viscosity, in other words, having a high degree of polymerization and a high strength, and yet having a good color tone.

BACKGROUND ART

Resin compositions prepared by reinforcing polyamide resin with inorganic fillers such as glass fiber, carbon fiber, talc and clay are widely known. However, in the case where these reinforcing materials constituted with inorganic fillers are used, the mechanical properties and the heat resistance are improved unfortunately only when these reinforcing materials are mixed in large amounts, and the obtained resin compositions are disadvantageously increased in mass because these reinforcing materials are high in specific gravity.

Recently, there has been investigated use of cellulose as reinforcing materials for resin materials. Examples of cellulose include celluloses obtained from wood, celluloses obtained from non-wood resources such as rice straw, cotton, kenaf, bagasse, abaca and hemp, and bacterial celluloses produced by microorganisms. These are found in very large quantities on the earth. Cellulose is excellent in mechanical properties, and accordingly, the inclusion of cellulose in a resin is expected to result in an effect to improve the properties of the resin composition. Moreover, cellulose is smaller in specific gravity than inorganic fillers, and accordingly a resin composition obtained by including cellulose in a resin is fortunately free from the increase of the mass.

As the method for including cellulose in a thermoplastic resin, it is a common method in which the resin and the cellulose are mixed with each other when the resin is in a molten condition. However, in this method, cellulose is mixed in the resin while the aggregated condition of the cellulose is being maintained, and hence a resin composition in which the cellulose is uniformly dispersed cannot be obtained. Consequently, the properties of the resin composition cannot be sufficiently improved.

As a technique for improving the dispersibility of cellulose in a resin, for example, WO2011/126038 discloses that a polyamide resin composition including cellulose uniformly dispersed therein is obtained by mixing an aqueous dispersion of the cellulose fiber having the average fiber diameter of 10 μm or less and the monomer constituting the polyamide resin and by subjecting the resulting mixture to a melt polymerization. JP2013-79334A discloses that a polyamide resin composition having a good color tone is obtained by not using any acid catalyst during polymerization.

SUMMARY OF INVENTION

Technical Problem

However, in the method described in WO2011/126038, the time of the melt polymerization is long, and accordingly, unfortunately coloration occurs due to the decomposition of cellulose. In the method described in JP2013-79334A, for the purpose of more increasing the degree of polymerization, the molten state is required to be maintained for a long time; consequently, sometimes coloration occurs, and the melt viscosity is thereby increased to make dispensing difficult.

From such a perspective as described above, an object of the present invention is to provide a polyamide resin composition containing cellulose, having a high viscosity, in other words, having a high degree of polymerization and a high strength, and yet having a good color tone and a good dispensing property.

Solution to Problem

The present inventors performed a series of diligent studies for the purpose of solving such problems as described above. Consequently, the present inventors have reached the present invention by discovering that the above-described object is achieved by allowing a polyamide resin composition having a specific value of the relative viscosity to have a high molecular weight by solid phase polymerization.

The gist of the present invention is as follows.

(1) A polyamide resin composition including 0.01 to 50 parts by mass of cellulose fiber in relation to 100 parts by mass of a polyamide resin, having a relative viscosity of 2.3 or more, and having an L-value, an a-value and a b-value in a Lab color space of 20 or more, 10 or less and 20 or less, respectively.

(2) The polyamide resin composition according to (1), further including phosphorous acid or sodium hypophosphite.

(3) The polyamide resin composition according to (1) or (2), wherein the polyamide resin is polyamide 6.

(4) The polyamide resin composition according to any one of (1) to (3), wherein the average fiber diameter of the cellulose fiber is 500 nm or less.

(5) A method for producing the polyamide resin composition according to any one of (1) to (4), wherein a polyamide resin composition having a relative viscosity of 2.2 or less is subjected to a solid phase polymerization.

Advantageous Effects of Invention

According to the present invention, it is possible to provide a polyamide resin composition including cellulose uniformly dispersed therein, having a high viscosity and a high strength, and yet having a good color tone and a good dispensing property.

DESCRIPTION OF EMBODIMENTS

The polyamide resin in the present invention refers to a polymer having an amide bond formed from an aminocarboxylic acid, a lactam, or a diamine and a dicarboxylic acid.

Examples of the aminocarboxylic acid include 6-aminocaproic acid, 11-aminoundecanoic acid, 12-aminododecanoic acid and para-aminomethyl benzoic acid.

Examples of the lactam include ε-caprolactam and ω-laurolactam.

Examples of the diamine include tetramethylenediamine, hexamethylenediamine, nonamethylenediamine, decamethylenediamine, undecamethylenediamine, dodecamethylenediamine, 2,2,4-/2,4,4-trimethylhexamethylenediamine, 5-methylnonamethylenediamine, 2,4-dimethyloctamethylenediamine, metaxylylenediamine, paraxylylenediamine, 1,3-bis(aminomethyl)cyclohexane, 1-amino-3-aminomethyl-3,5,5-trimethylcyclohexane, 3,8-bis(aminomethyl)tricyclodecane, bis(4-aminocyclohexyl)methane, bis(3-methyl-4-aminocyclohexyl)methane, 2,2-bis(4-aminocyclohexyl)propane, bis (aminopropyl)piperazine and aminoethylpiperazine.

Examples of the dicarboxylic acid include adipic acid, suberic acid, azelaic acid, sebacic acid, dodecanedioic acid, terephthalic acid, isophthalic acid, naphthalenedicarboxylic acid, 2-chloroterephthalic acid, 2-methylterephthalic acid, 5-methylisophthalic acid, 5-sodiumsulfoisophthalic acid, hexahydroterephthalic acid, hexahydroisophthalic acid and diglycolic acid.

More specifically, examples of the polyamide resin in the present invention include polycaproamide (polyamide 6), polytetramethyleneadipamide (polyamide 46), polyhexamethyleneadipamide (polyamide 66), polyhexamethylenesebacamide (polyamide 610), polyhexamethylenedodecamide (polyamide 612), polyundecamethyleneadipamide (polyamide 116), polyundecaneamide (polyamide 11), polydodecaneamide (polyamide 12), polytrimethyihexamethylene terephthalamide (polyamide TMHT), polyhexamethylene terephthalamide (polyamide 6T), polyhexamethylene isophthalamide (polyamide 6I), polyhexamethylene terephthal/isophthalamide (polyamide 6T/6I), polybis(4-aminocyclohexyl)methane dodecamide (polyamide PACM 12), polybis(3-methyl-4-aminocyclohexyl)methane dodecamide (polyamide dimethyl PACM 12), polymetaxylyleneadipamide (polyamide MXD6), polynonamethyleneterephthalamide (polyamide 9T), polydecamethyleneterephthalamide (polyamide 10T), polyundecamethyleneterephthalamide (polyamide 11T) and polyundecamethylenehexahydroterephthalamide (polyamide 11T(H)). These may also be copolymers or mixtures. Preferable among these are polyamide 6, polyamide 66, polyamide 11, polyamide 12, and copolymers of these and mixtures of these.

Examples of the cellulose fiber in the present invention include cellulose fibers derived from wood, rice straw, cotton, kenaf, bagasse, abaca and hemp; additionally, biological cellulose such as bacterial cellulose, valonia cellulose, and sea squirt cellulose; and also additionally, regenerated cellulose, and cellulose derivatives.

The polyamide resin composition of the present invention can be improved in mechanical strength through inclusion of cellulose fiber. For the purpose of sufficiently improving the mechanical strength of the resin composition, it is preferable to disperse cellulose fiber uniformly in the resin without aggregating cellulose fiber. The cellulose fiber is more easily dispersed with the increasing number of hydroxy groups on the cellulose fiber surface in contact with the polyamide resin, and hence the surface of the whole cellulose fiber is preferably large. Accordingly, the cellulose fiber is preferably made as fine as possible.

The cellulose fiber used to obtain the resin composition of the present invention has an average fiber diameter of preferably 10 µm or less and more preferably 500 nm or less. When the average fiber diameter exceeds 10 µm, the surface area of the cellulose fiber is small, and the dispersibility of the cellulose is sometimes degraded. On the other hand, the lower limit of the average fiber diameter is preferably 4 nm in consideration of the productivity of cellulose fiber. The average fiber diameter of the cellulose fiber after melt polymerization or forming a molded body of the resin composition tends to be smaller than the average fiber diameter of the cellulose fiber used. This is because the cellulose fiber is crushed due to the action of the shear force caused by melt polymerization or molding.

Cellulose fiber having an average fiber diameter of 10 µm or less can be obtained by splitting cellulose fiber into microfibrillated cellulose fiber. Examples of the apparatus for microfibrillation may include various crushing apparatuses such as a ball mill, a stone mill crusher, a high-pressure homogenizer and a mixer. Examples of the commercially available aqueous dispersion of microfibrillated cellulose fiber include "CELISH" manufactured by Daicel FineChem Ltd.

Examples of the cellulose fiber having an average fiber diameter of 10 µm or less may include a bacterial cellulose produced by bacteria. Examples of the bacterial cellulose include a bacterial cellulose produced by acetic acid bacteria of the genus *Acetobacter* as producing bacteria. Plant cellulose is formed through bundling of cellulose molecular chains, and is formed through bundling of very fine microfibrils. In contrast to this, the cellulose produced by the acetic acid bacteria is of a ribbon shape of 20 to 50 nm in width, and forms an extremely fine network as compared to plant cellulose. The bacterial cellulose is sometimes present concomitantly with acetic acid because bacteria produce acetic acid concomitantly with the cellulose. In this case, the solvent is preferably replaced with water.

Examples of the cellulose fiber having an average fiber diameter of 10 µm or less may include a fine cellulose. The fine cellulose can be produced, for example, by oxidizing a cellulose fiber in an aqueous solution containing an N-oxyl compound, a co-oxidant and an alkali metal bromide, and by subsequently subjecting the oxidized cellulose fiber to washing with water and defibration. Example of the N-oxyl compound include 2,2,6,6-tetramethylpiperidine-1-oxyl radical. Examples of the co-oxidant include sodium hypochlorite and sodium chlorite.

The oxidation reaction of the cellulose fiber is continued until the change of the pH is not found after the pH of the reaction solution is regulated to be approximately 10 by adding an alkaline compound such as an aqueous solution of sodium hydroxide. The reaction temperature is preferably normal temperature. After the completion of the reaction, the N-oxyl compound, the co-oxidant and the alkali metal bromide remaining in the reaction system are preferably removed. Examples of the method of washing with water include a method based on filtration and a method based on centrifugal separation. Examples of the defibration method include the methods using the various crushing apparatuses cited as the examples of the apparatus for the above-described microfibrillization.

The aspect ratio (average fiber length/average fiber diameter) of the cellulose fiber is preferably 10 or more, more preferably 50 or more and furthermore preferably 100 or more. When the aspect ratio is 10 or more, the mechanical strength of the polyamide resin composition is more improved.

The content of the cellulose fiber in the polyamide resin composition is required to be 0.01 to 50 parts by mass, and is preferably 0.05 to 30 parts by mass, more preferably 0.1 to 20 parts by mass, and furthermore preferably 0.1 to 10 parts by mass, in relation to 100 parts by mass of the polyamide resin. When the content of the cellulose fiber is less than 0.01 part by mass in relation to 100 parts by mass of the polyamide resin, there is no effect of improving the mechanical strength of the polyamide resin composition. On the other hand, when the content of the cellulose fiber exceeds 50 parts by mass in relation to 100 parts by mass of the polyamide resin, it is sometimes difficult to include the cellulose fiber in the resin composition, or the obtained resin composition sometimes undergoes coloration.

The polyamide resin composition of the present invention can be produced by using a polyamide resin composition having a relative viscosity of 2.2 or less in a solid phase polymerization.

The method for producing the polyamide resin composition to be used for the solid phase polymerization is not particularly limited. Examples of such a method include a method in which the monomer constituting the polyamide resin and an aqueous dispersion of the cellulose fiber are mixed, a catalyst is added to the resulting mixture, if necessary, and the mixture is subjected to a melt polymerization.

The aqueous dispersion of the cellulose fiber to be used for the melt polymerization can be obtained by mixing purified water and the cellulose fiber with a mixer or the like. The solid content is preferably 0.01 to 50% by mass.

The mixed solution of the monomer constituting the polyamide resin and the aqueous dispersion of the cellulose fiber is preferably a uniform dispersion prepared by mixing with a mixer or the like. The melt polymerization can be performed by heating the mixed solution to be increased in temperature to 150 to 270° C., and by stirring the mixed solution. In this case, by gradually discharging water vapor, the water content of the aqueous dispersion of the cellulose fiber can be discharged. The melt polymerization is required to be completed at a relative viscosity of 2.2 or less. When the relative viscosity after the melt polymerization exceeds 2.2, a risk of the occurrence of coloration is high. On the other hand, the lower limit of the relative viscosity after the melt polymerization is preferably 1.3. When the relative viscosity after the melt polymerization is less than 1.3, the handling after the melt polymerization is sometimes difficult, or the time to reach a practically necessary degree of polymerization is sometimes long, consequently cellulose is decomposed, and the viscosity of the obtained resin composition cannot be made high.

After the completion of the melt polymerization, the obtained polyamide resin composition is dispensed, and then preferably cut into pellets. From the viewpoint of handling and the viewpoint of the efficiency at the time of the following refinement, the pellets are preferably 2 to 5 mm in diameter and 3 to 6 mm in length, and more preferably 3 to 4 mm in diameter and 4 to 5 mm in length.

The polymer obtained by melt polymerization is preferably immersed in water at 90 to 100° C. to be refined, in order to remove the unreacted monomer and oligomers.

The solid phase polymerization is performed by heating the polymer after the melt polymerization or, if necessary, the polymer after the refinement at a temperature lower than the melting point of the polyamide resin composition for preferably 30 minutes or more and more preferably for 1 hour or more in a flow of an inert gas or under a reduced pressure. When the heating temperature is lower than (the melting point of the polyamide resin composition−75° C.), the reaction rate of the solid phase polymerization is sometimes made slow. On the other hand, when the heating temperature is near the melting point of the polyamide resin composition, the polymer is sometimes fusion-bonded and the coloration of the polymer sometimes occurs.

When the polymerization is performed, a polymerization catalyst may be used in order to increase the polymerization efficiency. The polymerization catalyst may be added in any of the steps of: before the melt polymerization, during the melt polymerization, before the refinement, during the refinement, before the solid phase polymerization and during the solid phase polymerization. Among these, the polymerization catalyst is preferably added before the melt polymerization. The polymerization catalyst is not particularly limited as long as the polymerization catalyst is a catalyst usually used in the melt polymerization of polyamide. In particular, a phosphorus-based compound is preferable, and phosphorous acid or sodium hypophosphite are more preferably used. By using phosphorous acid or sodium hypophosphite, the polymerization efficiency at the time of the solid phase polymerization is significantly improved. Consequently, the degree of polymerization can be made high in a short time as compared with the case where no polymerization catalyst is used.

In the above-described production method, the cellulose fiber is used as it is in a form of an aqueous dispersion for the melt polymerization, and thus no mutual aggregation of the cellulose fibers occurs. Consequently, it is possible to obtain a polyamide resin composition in which the cellulose fibers are satisfactorily dispersed. The solid phase polymerization is performed at a low temperature of equal to or lower than the melting point of the resin composition, and hence it is possible to suppress the degradation of the operability due to the viscosity increase at the time of the melt polymerization or the occurrence of the coloration.

The above-described production method allows the relative viscosity of the obtained polyamide resin composition to be 2.3 or more and to be preferably 2.5 or more. With respect to the color of the obtained polyamide resin composition, the above-described production method allows the L-value, the a-value and the b-value in the Lab color space to be 20 or more, 10 or less and 20 or less, respectively, preferably 30 or more, 7 or less and 20 or less, respectively, and more preferably 40 or more, 5 or less and 20 or less, respectively. When the L-value is less than 20, the color is nearly black; when the a-value is larger than 10, the color is reddish; and when the b-value is larger than 20, the color is yellowish.

The average fiber diameter of the cellulose fiber in the polyamide resin composition is preferably 500 nm or less, more preferably 100 nm or less and furthermore preferably 50 nm or less. The average fiber diameter of 500 nm or less of the cellulose fiber in the polyamide resin composition means the uniform dispersion of the cellulose fibers in the resin composition without causing the aggregation of the cellulose fibers. Consequently, there is obtained a resin composition excellent in the mechanical properties such as flexural strength and flexural modulus of elasticity. In addition, even when the content of the cellulose fiber is comparatively small, there is obtained a polyamide resin composition improved in the mechanical properties. Such a polyamide resin composition including the cellulose fibers uniformly dispersed therein is obtained by performing, as described above, the melt polymerization of the uniform mixed dispersion composed of the monomer constituting the polyamide resin and the aqueous dispersion of the cellulose fiber.

In the polyamide resin composition, within a range not impairing the advantageous effects of the present invention, for example, the following additives may also be added: a pigment, a heat stabilizer, an antioxidant, an antiweathering agent, a plasticizer, a lubricant, a release agent, an antistatic agent, an anti-impact agent, a flame retardant and a compatibilizing agent.

In the polyamide resin composition, within a range not impairing the advantageous effects of the present invention, polymers other than the polyamide resin may also be included. Examples of such other polymers include polyolefin, polyester, polycarbonate, polystyrene, polymethyl (meth)acrylate, poly(acrylonitrile-butadiene-styrene) copolymer, liquid crystal polymer and polyacetal.

The polyamide resin composition of the present invention can be molded into molded bodies by injection molding the polyamide resin composition. Examples of the injection molding machine used for injection molding include, without being particularly limited to: a screw in-line type injection molding machine and a plunger type injection molding machine. The polyamide resin composition heat-melted in the cylinder of an injection molding machine is metered at every shot, injected into a mold in a molten state, cooled and solidified in a predetermined shape, and then taken out as a molded body from the mold. The resin temperature at the time of injection molding is preferably equal to or higher than the melting point of the polyamide resin composition, and is preferably lower than (the melting point+100° C.). The polyamide resin composition used for the injection molding is preferably sufficiently dried. A polyamide resin composition having a high moisture content foams in the cylinder of an injection molding machine, and it is sometimes difficult to obtain an optimal molded body. Accordingly, the moisture content of the polyamide resin composition used for injection molding is preferably less than 0.3% by mass and more preferably less than 0.1% by mass.

The polyamide resin composition of the present invention has a high viscosity while having a good color tone, and thus, has an excellent mechanical strength. Consequently, the polyamide resin composition of the present invention can be suitably used for the application to vehicles, applications to electric and electronic devices, application to agriculture/fisheries, applications to medical devices, and applications to miscellaneous goods.

Examples of the applications to vehicles include: bodies such as bumpers, instrument panels, console boxes, garnishes, door trims, ceilings, floors, lamp reflectors, brush holders, fuel pump module components, distributers, sheet lead valves, wiper motor gears, speed meter frames, solenoid ignition coils, alternators, switches, sensor components, tie-rod end stabilizers, ECU cables, exhaust gas control valves, connectors, exhaust brake electromagnetic valves, engine valves, radiator fans, starters, injectors, panels around engines, engine covers, and motor covers.

Examples of the applications to electric and electronic devices include: personal computers, cellular phones, music players, car navigation, SMT connectors, IC card connectors, optical fiber connectors, microswitches, capacitors, chip carriers, coil sealing, transistor sealing, IC sockets, switches, relay components, capacitor housings, thermistors, various coil bobbins, FDD main chassis, tapecorder head mounts, stepping motors, bearings, shaver blade bases, lamp housings of liquid crystal projection TVs, microwave oven components, coil bases of electromagnetic cookers, dryer nozzles, steam dryer components, steam iron components, DVD pickup bases, commutator bases, circuit boards, ICs, liquid crystal jigs, food cutters, DAT cylinder bases, gears for copying machines, printer fixing unit components, light guide plates for liquid crystal panels, communication devices (antennas), semiconductor sealing materials, power modules, fuse holders, water pump impellers, pipes of semiconductor production apparatuses, connectors for game machines, air conditioner drain pans, garbage disposal cases, vacuum cleaner motor fan guides, microwave oven roller stay/ring, capstan motor bearings, street lamps, underwater pumps, motor insulators, motor brush holders, breaker components, personal computer enclosures, cellular phone enclosures, OA apparatus enclosure components, and gas meters.

Examples of the applications to agriculture and fisheries include containers, cultivation vessels and floats.

Examples of the applications to medical apparatuses include syringes and intravenous vessels.

Examples of the applications to miscellaneous goods include plates, cups, spoons, flowerpots, cooler boxes, fans, toys, ballpoint pens, rulers, clips, drain materials, fences, chests, power switchboards for construction, hot water supplier pump casings, impellers, joints, valves, and water faucet parts.

The polyamide resin composition of the present invention can be formed into films and sheets by heretofore known film formation methods such as T-die extrusion and inflation molding. The films and sheets obtained by molding the polyamide resin composition of the present invention can be used as film capacitors, release films for FPDs, and insulating films of vehicle-mounted motors.

The polyamide resin composition of the present invention can be formed into foams by applying a technique using a chemical foaming agent, or a technique using a supercritical gas or an inert gas. The foam obtained by molding the polyamide resin composition of the present invention can be used in the field of electric/electronic devices or in the field of vehicles.

The polyamide resin composition of the present invention can also be formed into various fibers or various non-woven fabrics by heretofore known spinning methods such as a melt-spinning method, a flush spinning method, an electro-spinning method and a melt-blow method. The fibers and the non-woven fabrics obtained by molding the polyamide resin composition of the present invention can be used as bag filters for electric dust collection, binding threads for motors, clothing interliners, dry non-woven fabrics, and felt.

EXAMPLES

The physical properties of the polyamide resin composition were measured by the following methods.

(1) Relative Viscosity

The polyamide resin composition was dissolved in 96% sulfuric acid in such a way that the concentration of the polyamide after removal of cellulose was 1 g/dL, and the relative viscosity was measured at 25° C. by using an Ubbelohde type viscometer.

(2) Dispensing Property of Melt Polymerization Product

A melt polymerization product was extruded under a nitrogen pressure of 0.7 MPa; a case where the yield was 80% or more in relation to the theoretical yield calculated from the amount of the placed monomer was determined to be "good," and a case where the aforementioned yield was less than 80% was determined to be "poor."

(3) Color Tone (L-Value, a-Value, b-Value)

The pellet of the polyamide resin composition was filled in a pellet measurement cell, an attachment of the spectrophotometer SE-6000 manufactured by Nippon Denshoku Industries Co., Ltd. (35 mm in diameter×15 mm in height), and the reflection from the pellet was measured by using the spectrophotometer SE-6000. The light source used was a C-2 light source.

(4) Flexural Strength and Flexural Modulus of Elasticity

The polyamide resin composition was sufficiently dried, then subjected to a molding by using an injection molding machine (Model IS-80G, manufactured by Toshiba Machine Co., Ltd.) and by using a mold for a ⅛-inch 3-point bending test specimen based on the ASTM standard, to prepare a specimen of 127 mm in length×12.7 mm in width×3.2 mm (⅛ inch) in thickness.

By using the obtained specimen, according to ASTM D790, the flexural strength and the flexural modulus of elasticity were measured. The atmosphere temperature was 23° C., and the deformation speed was 1 mm/min.

(5) Average Fiber Diameter of Cellulose Fiber

The cellulose fiber to be used for the melt polymerization was freeze-dried, if necessary, and was observed by using a field-emission scanning electron microscope (S-4000, manufactured by Hitachi Ltd.).

By using a freeze ultramicrotome, a 100-nm thick section of the cellulose fiber in the polyamide resin composition was sampled and dyed with $OsO_4$ (osmium tetraoxide), and then the section was observed with a transmission electron microscope (JEM-1230, manufactured by JEOL Ltd.).

From the obtained electron microscopic image, the length of the cellulose fiber in the direction perpendicular to the lengthwise direction of the cellulose fiber was measured, and the maximum length in the perpendicular direction was taken as the fiber diameter. In the same manner, the fiber diameter of ten cellulose fibers (monofilaments) were measured, and the average value derived from the obtained 10 fiber diameters was taken as the average fiber diameter.

In the case where the fiber diameter of the cellulose fiber is large, the cellulose fiber itself, or a 10-μm thick section cut out from the pellet of the polyamide resin composition with a microtome was observed with a stereomicroscope (SZ-40, manufactured by Olympus Corp.), and the average fiber diameter was determined in the same manner as in the case where an electron microscope image was used.

Example 1

[Preparation of Aqueous Dispersion of Cellulose Fiber]

As an aqueous dispersion of cellulose fiber, Celish KY110N (manufactured by Daicel FineChem Ltd.; including 15% by mass of cellulose fiber having an average fiber diameter of 125 nm) was used. Purified water was added to the aqueous dispersion, and the resulting mixture was stirred with a mixer to prepare an aqueous dispersion having a cellulose fiber content of 3% by mass.

[Melt Polymerization]

With a mixer, 70 parts by mass of the obtained aqueous dispersion of the cellulose fiber, and 100 parts by mass of ε-caprolactam were stirred and mixed until a uniform dispersion was obtained. The resulting mixed dispersion was increased in temperature to 240° C. over 4 hours while the mixed dispersion was being stirred and the pressure was being controlled at 0.7 MPa. Then, the pressure was released to atmospheric pressure, and a melt polymerization was performed at 240° C. for 0.5 hour.

After the completion of the melt polymerization, the polyamide resin composition was dispensed and cut into pellets.

[Refinement and Solid Phase Polymerization]

The obtained pellet was treated with hot water at 95° C. for 12 hours for refinement and then dried at 100° C. for 12 hours.

The dried pellet was subjected to a solid phase polymerization in a flow of nitrogen gas at 170° C. for 15 hours.

Examples 2 to 8 and Comparative Example 2

[Melt Polymerization]

In each of Examples 2 to 8 and Comparative Example 2, the content of the cellulose fiber, the use or nonuse of a polymerization catalyst, the type and content of the polymerization catalyst when the polymerization catalyst was used, and the reaction time were altered as listed in Table 1 as compared with Example 1. Other than that, in the same manner as in Example 1, a melt polymerization was performed.

After the completion of the melt polymerization, the polyamide resin composition was dispensed, and cut into pellets.

[Refinement and Solid Phase Polymerization]

By using the obtained pellet, a refinement and a solid phase polymerization were performed in the same manner as in Example 1.

Example 9

[Preparation of Aqueous Dispersion of Cellulose Fiber]

Into a 200-mL volume Erlenmeyer flask, 50 mL of a culture medium having a composition including 0.5% by mass of glucose, 0.5% by mass of polypeptone, 0.5% by mass of yeast extract and 0.1% by mass of magnesium sulfate heptahydrate was dispensed, and was sterilized by steam at 120° C. for 20 minutes in an autoclave. To this culture medium, a platinum loop of *Gluconacetobacter xylinus* (NBRC 16670) grown in a test tube slant agar medium was inoculated, and the resulting culture was subjected to a static incubation at 30° C. for 7 days. After 7 days, a white gel film-like bacterial cellulose was produced in the upper layer of the culture.

The obtained bacterial cellulose was crushed with a mixer, then repeatedly immersed in water and washed with water; thus substitution with water was performed, and consequently an aqueous dispersion having a content of the cellulose fiber of 4.1% by mass was prepared. The average fiber diameter of the cellulose fiber was 60 nm.

[Melt Polymerization]

Example 9 was different from Example 1 in that 24.4 parts by mass of the obtained aqueous dispersion of the cellulose fiber was used in combination with 100 parts by mass of ε-caprolactam. Other than that, in the same manner as in Example 1, a melt polymerization was performed, and pellets were prepared.

[Refinement and Solid Phase Polymerization]

By using the obtained pellet, a refinement and a solid phase polymerization were performed in the same manner as in Example 1.

Example 10

[Preparation of Aqueous Dispersion of Cellulose Fiber]

In 100 mL of water containing 0.025 g of 2,2,6,6-tetramethyl-1-piperidine-N-oxyl and 0.25 g of sodium bromide as dissolved therein, 2 g of cellulose (qualitative filter paper No. 1) was dispersed. Then, a 13% by mass aqueous solution of sodium hypochlorite as a co-oxidant was added to the resulting dispersion in such a way that the amount of sodium hypochlorite in relation to 1 g of pulp was 4.3 mmol. By using a pH stat, an aqueous solution of sodium hydroxide was added to the dispersion in such a way that the pH of the dispersion was 10.5, and the reaction was terminated at the time point when the pH showed no change. The contents of the reaction vessel used were washed with water four times by a centrifugal separation method, and then defibrated for 30 minutes with a household mixer; thus, an aqueous dispersion having a content of the cellulose fiber of 1.6% by mass was prepared. The average fiber diameter of the obtained cellulose fiber was 10 nm.

[Melt Polymerization]

By using a mixer, 95 parts by mass of the obtained aqueous dispersion of the cellulose fiber and 150 parts by mass of ε-caprolactam were stirred and mixed until a uniform dispersion was obtained. The mixed dispersion was increased in temperature to 240° C. over 6 hours while the mixed dispersion was being stirred and the pressure was being controlled at 0.7 MPa. Then, the pressure was released to atmospheric pressure, and the melt polymerization was performed at 240° C. for 0.5 hour. When the fed amount (150 parts by mass) of ε-caprolactam was converted into 100 parts by mass, the converted fed amounts of the respective components were as listed in Table 1.

After the completion of the melt polymerization, the polyamide resin composition was dispensed, and cut into pellets.

[Refinement and Solid Phase Polymerization]

By using the obtained pellet, a refinement and a solid phase polymerization were performed in the same manner as in Example 1.

Comparative Example 1

[Melt Polymerization]

The content of the cellulose fiber in a mixed dispersion for a melt polymerization was regulated in such a way that the content of the cellulose fiber was 60 parts by mass in relation to 100 parts by mass of ε-caprolactam. The resulting mixed dispersion was used, and the reaction time was set to be altered to 1.5 hours as compared with Example 1. The melt polymerization was tried to be performed otherwise in the same manner as in Example 1; however, because the content of the cellulose fiber was larger than the range specified in the present invention, the cellulose was separated and no cellulose-containing polymer was able to be obtained.

Comparative Examples 3 to 6

[Melt Polymerization]

In each of Comparative Examples 3 to 6, the content of the cellulose fiber, the use or nonuse of a polymerization catalyst, the type and content of the polymerization catalyst when the polymerization catalyst was used, and the reaction time were altered as listed in Table 1 as compared with Example 1. Other than that, in the same manner as in Example 1, a melt polymerization was performed.

After the completion of the melt polymerization, the polyamide resin composition was dispensed, and cut into pellets.

[Refinement]

By using the obtained pellet, a refinement was performed in the same manner as in Example 1.

Comparative Example 7

[Preparation of Aqueous Dispersion of Cellulose Fiber]

In 100 mL of water containing 0.025 g of 2,2,6,6-tetramethyl-1-piperidine-N-oxyl and 0.25 g of sodium bromide as dissolved therein, 2 g of cellulose (qualitative filter paper No. 1) was dispersed. Then, a 13% by mass aqueous solution of sodium hypochlorite as a co-oxidant was added to the resulting dispersion in such a way that the amount of sodium hypochlorite in relation to 1 g of pulp was 4.3 mmol. By using a pH stat, an aqueous solution of sodium hydroxide was added to the dispersion in such a way that the pH of the dispersion was 10.5, and the reaction was terminated at the time point when the pH showed no change. The contents of the reaction vessel used were washed with water four times by a centrifugal separation method, and then defibrated for 30 minutes with a household mixer; thus, an aqueous dispersion having a content of the cellulose fiber of 1.6% by mass was prepared. The average fiber diameter of the obtained cellulose fiber was 10 nm.

[Melt Polymerization]

By using a mixer, 95 parts by mass of the obtained aqueous dispersion of the cellulose fiber and 150 parts by mass of ε-caprolactam were stirred and mixed until a uniform dispersion was obtained. As a polymerization catalyst, 0.3 part by mass of phosphorous acid was further added to the mixed dispersion, and then the mixed dispersion was increased in temperature to 240° C. over 6 hours while the mixed dispersion was being stirred and the pressure was being controlled at 0.7 MPa. Then, the pressure was released to atmospheric pressure, and the melt polymerization was performed at 240° C. for 1.0 hour. When the fed amount (150 parts by mass) of ε-caprolactam was converted into 100 parts by mass, the converted fed amounts of the respective components were as listed in Table 1.

After the completion of the melt polymerization, the polyamide resin composition was dispensed, and cut into pellets.

[Refinement]

The obtained pellet was treated with hot water at 95° C. for 12 hours for refinement and then dried.

For each of Examples 1 to 10 and Comparative Examples 1 to 7, Table 1 shows the melt polymerization conditions, the values of the properties of the melt polymerization product, the dispensing property of the melt polymerization product, the solid phase polymerization conditions, and the values of the properties of the solid phase polymerization product.

TABLE 1

| | | | | | Examples | | | | | | | | |
|---|---|---|---|---|---|---|---|---|---|---|---|---|---|
| | | | | | 1 | 2 | 3 | 4 | 5 | 6 | 7 | 8 | 9 |
| Melt poly-merization conditions | Feed (parts by mass) | Monomer | ε-Caprolactam | parts by mass | 100 | 100 | 100 | 100 | 100 | 100 | 100 | 100 | 100 |
| | | Cellulose fibers | KY110N | parts by mass | 2 | 0.1 | 1 | 20 | 2 | 2 | 2 | 2 | — |
| | | | Bacterial cellulose | parts by mass | — | — | — | — | — | — | — | — | 1 |
| | | | Fine cellulose | parts by mass | — | — | — | — | — | — | — | — | — |
| | | Catalyst | Phos-phorous acid | parts by mass | — | 0.1 | 0.1 | 0.1 | 0.1 | — | — | — | 0.1 |
| | | | Sodium hypo-phosphite | parts by mass | — | — | — | — | — | 0.05 | — | — | — |

TABLE 1-continued

| | | | | | | | | | | | |
|---|---|---|---|---|---|---|---|---|---|---|---|
| Reaction Conditions | Reaction temperature | °C. | 240 | 240 | 240 | 240 | 240 | 240 | 240 | 240 | 240 |
| | Reaction time | hr | 0.5 | 0.5 | 0.5 | 0.5 | 0.5 | 0.5 | 0.4 | 0.4 | 0.5 |
| Values of properties of melt polymerization product | Relative viscosity | | 1.8 | 2.0 | 1.7 | 1.7 | 1.9 | 1.8 | 1.9 | 2.2 | 1.9 |
| | Dispensing property of melt polymerization product | | Good | Good | Good | Good | Good | Good | Good | Good | Good |
| Solid phase polymerization conditions | Reaction temperature | °C. | 170 | 170 | 170 | 170 | 170 | 170 | 170 | 170 | 170 |
| | Reaction time | hr | 15 | 15 | 15 | 15 | 15 | 15 | 20 | 30 | 15 |
| Values of properties of solid phase polymerization product | Relative viscosity | | 2.8 | 3.0 | 2.8 | 2.8 | 2.9 | 3.2 | 2.7 | 3.5 | 2.7 |
| | Color tone L-value | | 54.2 | 60.3 | 51.7 | 35.0 | 51.3 | 52.5 | 56.7 | 51.0 | 68.5 |
| | a-value | | 6.5 | 2.5 | 5.8 | 4.3 | 7.5 | 6.8 | 2.4 | 5.6 | 1.0 |
| | b-value | | 19.2 | 18.1 | 18.9 | 19.8 | 19.4 | 19.3 | 18.2 | 18.7 | 17.2 |
| | Flexural strength | MPa | 144 | 135 | 138 | 195 | 147 | 146 | 134 | 133 | 155 |
| | Flexural modulus of elasticity | GPa | 3.5 | 3.2 | 3.4 | 5.8 | 4.0 | 3.8 | 3.2 | 3.2 | 4.1 |
| | Average fiber diameter of cellulose fiber | nm | 55 | 51 | 55 | 75 | 48 | 57 | 56 | 57 | 42 |

| | | | | Examples | Comparative Examples | | | | | | |
|---|---|---|---|---|---|---|---|---|---|---|---|
| | | | | 10 | 1 | 2 | 3 | 4 | 5 | 6 | 7 |
| Melt polymerization conditions | Feed (parts by mass) | Monomer | ε-Caprolactam | parts by mass | 100 | 100 | 100 | 100 | 100 | 100 | 100 | 100 |
| | | Cellulose fibers | KY110N | parts by mass | — | 60 | 2 | — | 2 | 2 | 2 | — |
| | | | Bacterial cellulose | parts by mass | — | — | — | — | — | — | — | — |
| | | | Fine cellulose | parts by mass | 1 | — | — | — | — | — | — | 1 |
| | | Catalyst | Phosphorous acid | parts by mass | — | — | — | — | — | 0.1 | 0.1 | 0.2 |
| | | | Sodium hypophosphite | parts by mass | — | — | — | — | — | — | — | — |
| | Reaction Conditions | Reaction temperature | °C. | 240 | 240 | 240 | 240 | 240 | 240 | 240 | 240 |
| | | Reaction time | hr | 0.5 | 1.5 | 1.0 | 1.5 | 1.5 | 1.5 | 2.5 | 1.0 |
| Values of properties of melt polymerization product | Relative Viscosity | | | 1.8 | Failed in polymerization | 2.3 | 2.6 | 2.4 | 2.4 | 2.8 | 2.6 |
| | Dispensing property of melt polymerization product | | | Good | | Good | Good | Poor | Poor | Poor | Poor |
| Solid phase polymerization conditions | Reaction temperature | | | 170 | | 170 | — | — | — | — | — |
| | Reaction time | | | 15 | | 15 | — | — | — | — | — |
| Values of properties of solid phase polymerization product | Relative viscosity | | | 2.3 | | 3.0 | — | — | — | — | — |
| | Color tone | L-value | | 75 | | 39.1 | 68.2 | 57.7 | 38.2 | 61.0 | 78.0 |
| | | a-value | | 2.0 | | 11.1 | −0.1 | 5.9 | 12.5 | 9.5 | 5.0 |
| | | b-value | | 19.5 | | 25.0 | −2.2 | 20.3 | 21.3 | 23.2 | 21.2 |
| | Flexural strength | MPa | | 131 | | 148 | 129 | 158 | 156 | 152 | 136 |
| | Flexural modulus of elasticity | GPa | | 3.2 | | 3.6 | 3.0 | 4.2 | 4.0 | 4.0 | 3.3 |

TABLE 1-continued

| | | | | | | | | | |
|---|---|---|---|---|---|---|---|---|---|
| Average fiber diameter of cellulose fiber | nm | 7 | | 52 | 53 | 52 | 57 | 54 | 8 |

(Note)
For Comparative Examples 3 to 7, in the rows of the values of the properties of the solid phase polymerization products, the values of the properties of the melt polymerization products are listed.

The polyamide resin compositions of Examples 1 to 10 were each found to have a relative viscosity of 2.3 or more, an L-value of 20 or more, an a-value of 10 or less, and a b-value of 20 or less.

As can be seen from a comparison of Example 1 with Examples 5 and 6, by using phosphorous acid or sodium hypophosphite as the polymerization catalyst, the relative viscosity after the solid phase polymerization performed for the same period of time is increased.

In the polyamide resin composition of Comparative Example 2, because the relative viscosity of the polyamide resin composition used for the solid phase polymerization was higher than the preferable range specified in the present invention, the a value was larger than 10 and the b value was larger than 20.

The polyamide resin composition of Comparative Example 3 did not use any cellulose fiber, and hence was low in flexural strength.

The polyamide resin compositions of Comparative Examples 4 to 7 were each increased in the degree of polymerization only by melt polymerization, and hence were poor in the dispensing property, and each had a b value larger than 20. In particular, the polyamide resin composition of Comparative Example 6 had a viscosity highest possible by melt polymerization. An extension of the polymerization time to be longer than the polymerization time listed in Table 1 resulted in the decomposition of the cellulose fiber and did not increase the viscosity.

The invention claimed is:

1. A polyamide resin composition comprising 0.01 to 50 parts by mass of cellulose fiber in relation to 100 parts by mass of a polyamide resin which has a relative viscosity of 2.3 or more, and having an L-value, an a-value and a b-value in an Lab color space of 20 or more, 10 or less and 20 or less, respectively.

2. The polyamide resin composition according to claim 1, further comprising phosphorous acid or sodium hypophosphite.

3. The polyamide resin composition according to claim 1, wherein the polyamide resin is polyamide 6.

4. The polyamide resin composition according to claim 1, wherein an average fiber diameter of the cellulose fiber is 500 nm or less.

5. A method for producing the polyamide resin composition according to claim 1, including the step of:
subjecting a polyamide resin composition having a relative viscosity of 2.2 or less to a solid phase polymerization.

6. The polyamide resin composition according to claim 2, wherein the polyamide resin is polyamide 6.

7. The polyamide resin composition according to claim 2, wherein an average fiber diameter of the cellulose fiber is 500 nm or less.

8. A method for producing the polyamide resin composition according to claim 2, including the step of:
subjecting a polyamide resin composition having a relative viscosity of 2.2 or less to a solid phase polymerization.

9. A method for producing the polyamide resin composition according to claim 3, including the step of:
subjecting a polyamide resin composition having a relative viscosity of 2.2 or less to a solid phase polymerization.

10. A method for producing the polyamide resin composition according to claim 4, including the step of:
subjecting a polyamide resin composition having a relative viscosity of 2.2 or less to a solid phase polymerization.

* * * * *